(12) United States Patent
Gharabegian

(10) Patent No.: US 9,560,911 B1
(45) Date of Patent: Feb. 7, 2017

(54) CONFIGURABLE TABLE

(71) Applicant: Armen Sevada Gharabegian, Glendale, CA (US)

(72) Inventor: Armen Sevada Gharabegian, Glendale, CA (US)

(73) Assignee: Eleven23 Marketing, LLC, Glendale, CA (US)

( * ) Notice: Subject to any disclaimer, the term of this patent is extended or adjusted under 35 U.S.C. 154(b) by 0 days.

(21) Appl. No.: 14/820,403

(22) Filed: Aug. 6, 2015

(51) Int. Cl.
  *A47B 13/00* (2006.01)
  *F16B 1/00* (2006.01)
(52) U.S. Cl.
  CPC ............. *A47B 13/003* (2013.01); *F16B 1/00* (2013.01); *F16B 2001/0035* (2013.01)
(58) Field of Classification Search
  CPC . A47B 13/003; A47B 13/02; F16B 2001/0035
  See application file for complete search history.

(56) References Cited

U.S. PATENT DOCUMENTS

| | | | | |
|---|---|---|---|---|
| 8,225,726 B1* | 7/2012 | Fineberg | .................. | A47B 3/06 108/115 |
| 2015/0028633 A1* | 1/2015 | Stubbs | ..................... | A47B 7/00 297/135 |
| 2015/0208798 A1* | 7/2015 | Glenn, II | ............... | A47B 13/02 108/158.11 |
| 2015/0351537 A1* | 12/2015 | Grabowski | .......... | A47B 13/021 108/64 |
| 2016/0015177 A1* | 1/2016 | Blake | ................... | A47B 87/002 108/64 |

* cited by examiner

*Primary Examiner* — Daniel Rohrhoff

(57) ABSTRACT

A configurable table, comprises a first element link frame, a second element link frame, a first connection node, a second connection node, and a plurality of magnetic elements. Each of the connection nodes comprises a channel, the channel have a plurality of holders. The plurality of magnetic elements are disposed in the plurality of holders and connecting to the first element link frame and the second element fame.

16 Claims, 21 Drawing Sheets

900

CONFIGURABLE TABLE

BACKGROUND

1. Field

The subject matter disclosed herein relates to a methods and systems for providing a table platform that is configurable to address different customer needs.

2. Information/Background of the Invention

Conventional table designs are designed with specific dimensions in order to allow for easy and low cost manufacture in overseas locations. The result is a table or table system that has specific dimensions for pairing with chairs, sofas, ottomans and other types of furniture. Modifications in a design of a table system results in higher cost of manufacture. This leaves interior designers, house owners, studio designers, or exhibit designers with little flexibility in meeting different needs of clients and/or customers.

Accordingly, a need exists for a table or table system design that has flexibility to meet the varying needs of different clients.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1A:
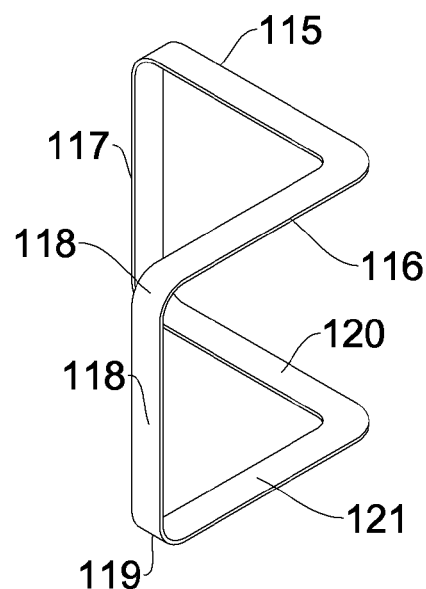
FIG. 1A illustrates an element link frame according to an embodiment

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

Reference is now made in detail to the description of non-limiting embodiments as illustrated in the drawings. While the embodiments described may use specific materials or configurations, there is no intent to limit the subject matter to the embodiment or embodiments disclosed herein. Accordingly, various modifications to the embodiments presented may be readily apparent to those skilled in the art, and the generic principles described herein can be applied to other non-limiting embodiments without departing from the spirit or scope of the claimed subject matter. As such, this detailed description of various alternative embodiments should not be construed to limit the scope or breadth of the present apparatus, system and method as set forth in the claims The invention disclosed herein is directed to a furniture assembly. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

FIGS. 1A-1D illustrate a configurable table according to an embodiment. FIG. 1A illustrates an element link frame according to an embodiment. A configurable table may include a plurality of element link frames. In an embodiment, the element link frame 110 may be comprised of stainless steel. An element link frame 110 may be comprised of other metals such as aluminum, steel, nickel, gold, platinum, or similar metals. In an embodiment, an element link frame 110 may have pairs of horizontal sections (e.g., a first pair 115 116 and a second pair 120 121). In an embodiment, pairs of horizontal sections (the first pair 115 116 and the second pair 120 121) may be parallel to one other, e.g., may lie in different vertical planes but have a same horizontal orientation. This may allow a table top to be placed in a fashion to be parallel to a floor surface. In an embodiment, a first section 115 and a second section 116 may be positioned at right angles to each other. In other embodiments, a first horizontal section 115 and a second horizontal section 116 may be positioned at from 45 degrees to 135 degrees with respect to each other. Pairs of link element horizontal sections (the first pair 115 116 and the second pair 120 121) may be connected or coupled to each other by link vertical elements 117 and 118. In an embodiment, pairs of horizontal sections 115 116 and 120 121 may be connected to vertical elements 117 and 118 by rounded pieces 119. In an embodiment, vertical elements 117 and 118 may be comprised of stainless steel. In an embodiment, rounded pieces 119 may be comprised of stainless steel. In an embodiment, element link frames 110 may provide strong support based on the material strength, uniformity in design and symmetry between multiple elements.

Figure 1B:
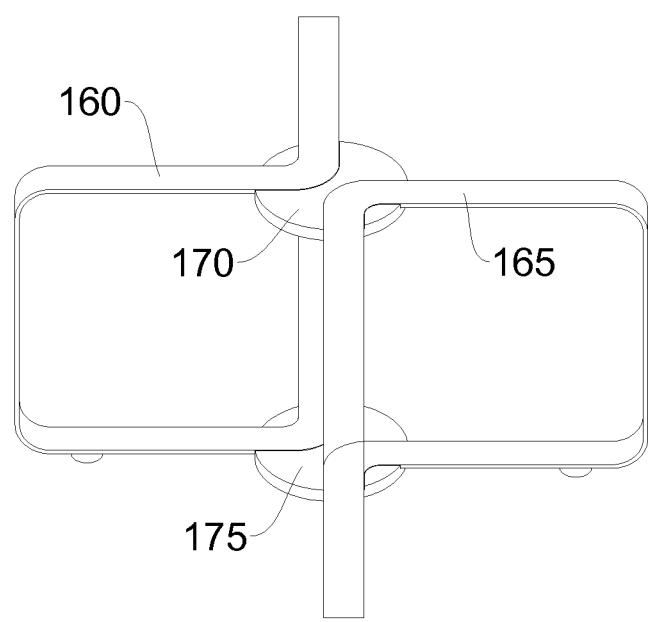
FIG. 1B illustrates a configurable table without a top according to an embodiment.

FIG. 1B illustrates a configurable table without a top according to an embodiment. In an embodiment, configurable table 150 may comprise a first element link frame 160, a second element link frame 165, and a pair of connection nodes 170 175. In an embodiment, a first connection node 175 is placed on a surface or is at rest on a surface (such as a floor). In an embodiment, first element link frame 160 and second element link frame 165 may be placed into grooves (not pictured) in the first connection node 175. In an embodiment, grooves may also be referred to as channels. In an embodiment illustrated in FIG. 1B, a top surface of first connection node 175 may include channels in which a first element link frame 160 and a second element link frame 165 reside. In an embodiment, a first element link frame 160 and a second element link frame 165 are placed in a symmetrical relationship with respect to each other. In this embodiment, this results in a first element link frame 160 and a second element link frame 165 forming a configurable table with four vertical elements 117 118 (FIG. 1) being spaced approximately 90 degrees apart with respect to each other. In an embodiment, a second connection node 170 is connected to a surface of horizontal sections and rounded pieces of a first element link frame 160 and a second element link frame 165. In an embodiment, a first element link frame 160 and a second element link frame 165 may be placed into grooves of a second connection node 170. The first element link frame 160 and a second element link frame 165 may be placed into a channel on a top surface of a second connection node 170. In an embodiment, a second connection node 170 may be held in place by a magnetic connection or coupling. In an embodiment, a second connection node may be held in place by glue.

Figure 1C:
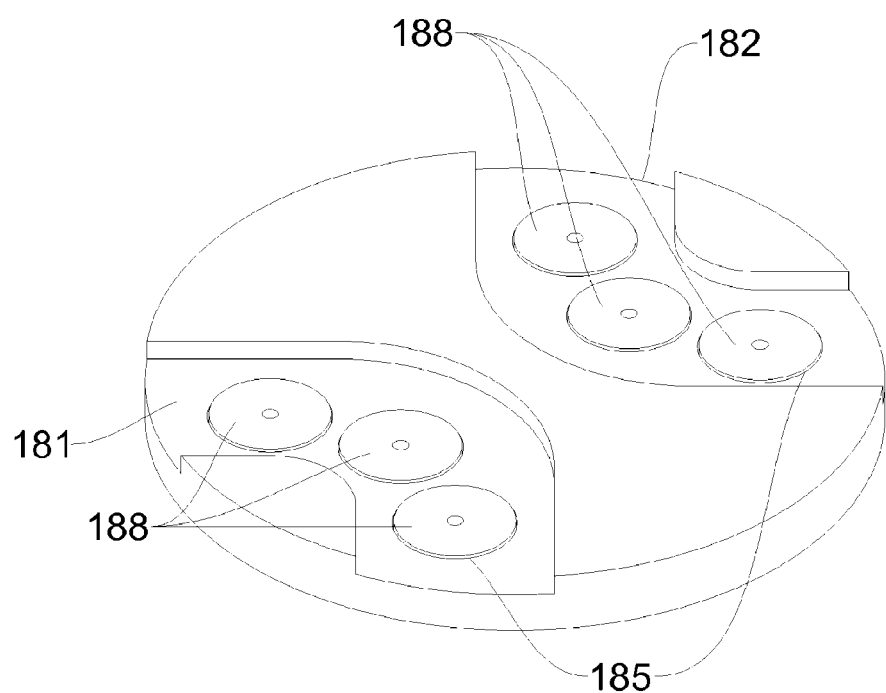
FIG. 1C illustrates a connection node according to an embodiment.

FIG. 1C illustrates a connection node according to an embodiment. In the illustrative embodiment, the connection node 170 may include a first channel 181 and a second channel 182. In an embodiment, a first channel 181 and a second channel 182 may have a curved shape, although other shapes may be utilized depending on shapes of link element frames that are placed into and/or reside in channels 181 182. In an embodiment, the curved shape may accommodate the corners of the horizontal sections of the element link frame such as, for example, element link frame 120 121 (see FIG. 1A).

In an embodiment, a first channel 181 may include a plurality of recessed placeholders 185. In an embodiment illustrated in FIG. 1C, for example, connection node 170 may have three recessed placeholders 185. In this embodiment, one or more placeholders 185 may be recessed into a first channel 181 and a second channel 182. In other words, there may be one or more holes cut into first channel 181 and/or second channel 182. In an embodiment, recessed placeholders 185 may be circular in shape. In alternative embodiments, recessed placeholders 185 but may have a shape of a rectangle, a polygon, a square, or other shapes that accommodate magnetic elements. In an embodiment, embedded magnetic elements 188 may be placed into the placeholders 185. Recessed placeholders 185 may have a depth and/or height that is approximately the same size or greater than a height and/or thickness of embedded magnetic elements 188. In an embodiment, embedded magnetic elements 188 may rest in recessed placeholder 185 and be flush with a surface level of channels 181 182. In an embodiment, embedded magnet 188 may not rest above the surface level of channels 181 182 because this may cause a link element to be uneven and not provide a level surface for a table top to rest and/or to reside on a surface. In an embodiment, embedded magnetic elements 188 may hold metal of the element link frame 110 in place in a first channel 181 and/or a second channel 182 to provide support for a configurable chair. In an embodiment, recessed placeholders 185 may have a bottom surface which is magnetic to hold embedded magnetic elements 188 in place so that embedded magnetic elements may not fall out of channels 181 182. In an alternative embodiment, a fastener may hold the embedded magnetic elements 188 in place in recessed placeholders 185. In an embodiment, a fastener may be a screw, a nail, a nut/bolt combination, or an adhesive. In an embodiment, embedded magnetic elements 188 may be comprised of iron or other magnetic material. In an embodiment, embedded magnetic elements 188 may be pressed into placeholders 185 during a manufacture or assembly. In an embodiment, embedded magnetic elements 188 may be adhered or glued into placeholders 185. As is illustrated in FIG. 1C, each channel 181 and 182 may have three embedded magnetic elements 188 resting in three recessed placeholders 185. In an embodiment, connection node 170 may be comprised of a wood, metal, plastic, ceramic, or a composite material, or any combination thereof. In an embodiment, connection node 170 may be made of a non-conductive material.

Figure 1D:
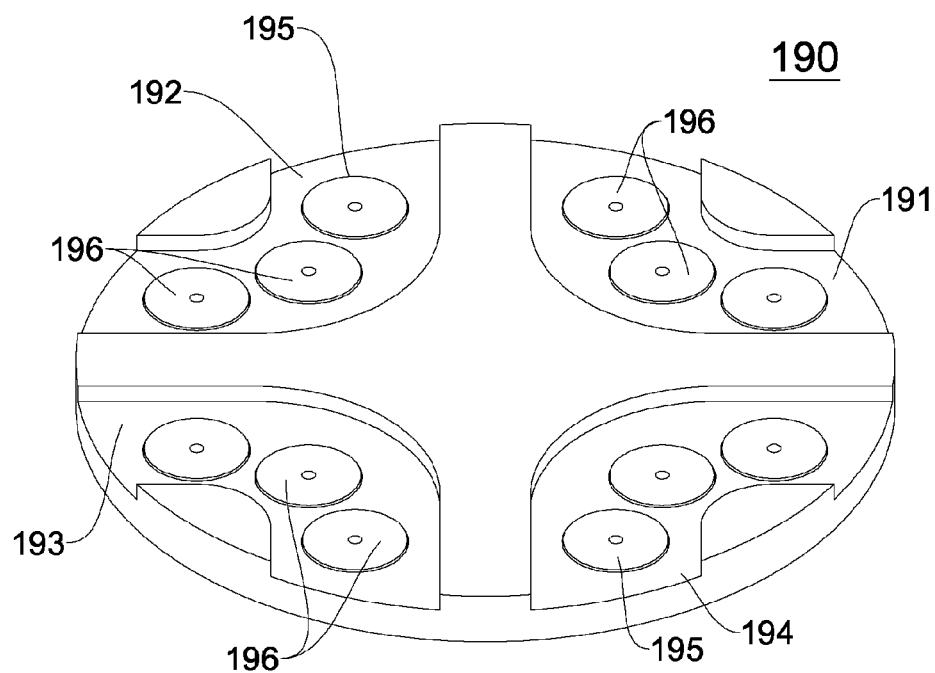
FIG. 1D is illustrative of a connection node including four channels according to an embodiment.

FIG. 1D is illustrative of a connection node including four channels according to an embodiment. In an example embodiment illustrated in FIG. 1D, connection node 190 may comprise four channels 191 192 193 194. In this embodiment, four channels 191 192 193 194 may include three recessed placeholders 195 and three embedded magnetic elements 196. The scope of the invention described herein is not limited to three magnetic elements and more or less embedded magnetic elements may be utilized in other embodiments depending on the overall dimensions of a connection node, one or more channels, and/or one or more recessed placeholders.

Figure 1E:
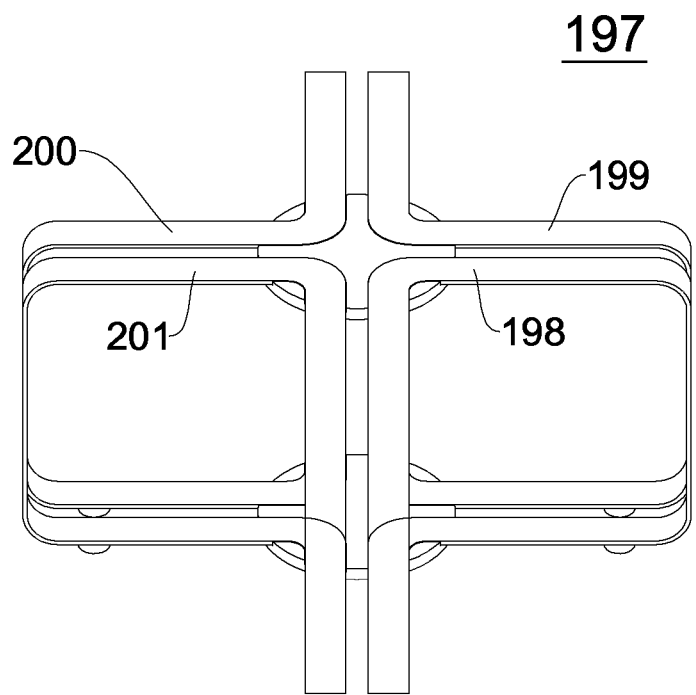
FIG. 1E illustrates a configurable table without a top utilizing a connection node comprising four channels.

FIG. 1E illustrates a configurable table without a top utilizing a connection node comprising four channels. In this embodiment, a configurable table 197 may comprise two connection nodes 190 and four element link frames 198 199 200 201. In this embodiment, an element link frame is at a right angle to an adjoining element link frames. For example, element link frame 199 is placed at approximately a right angle to element link frame 198 and element link frame 200. In an embodiment element link frame may be constructed to be placed at other angle combinations with respect to other element link frames. Horizontal sections of element link frames may be positioned parallel to each other in a horizontal plane (e.g., in FIG. 1E, horizontal sections of element link frames 198 199 200 201 may be placed in positions parallel with respect to other link frames). In an embodiment, pairs of link frame elements e.g., link elements 198 199, may be symmetrical with respect to other pairs of link frame elements. As an example, in FIG. 1E, link elements 200 201 are symmetrical with respect to link element frames 198 199 across a vertical plane.

Figure 1F:
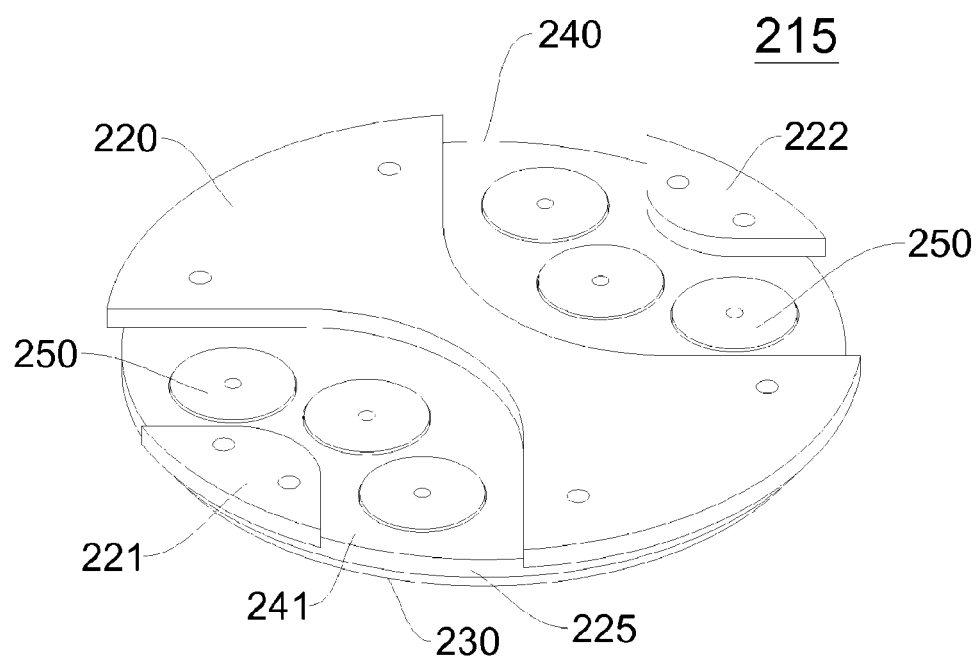
FIG. 1F illustrates a multi-piece connection node according to an embodiment.

FIG. 1F illustrates a multi-piece connection node according to an embodiment. In an embodiment, a multi-piece connection node 215 may not be made of a unitary piece of material. Instead, multi-piece connection node 215 may be comprised and/or made of a plurality of pieces and/or plates. In the illustrative embodiment of FIG. 1F, connection node 215 may comprise a plurality of pieces and/or plates. For example, plate 230 may rest against a surface (such as a floor) and, in an embodiment, plate 230 may be a smaller size (e.g., have a smaller diameter) than the plate 225 or may have approximately the same diameter as plate 230. Plate 225 may be connected to plate 230 by fasteners such as screws, nails, nuts and bolts or an adhesive. In an embodiment, plate pieces 215 220 and 221 may be fastened to second level plate 225 by fasteners 223 such as screws, nails, nuts and bolts or an adhesive. In an embodiment, a piece 220 may be positioned on a top surface of central plate 225 and together with pieces 222 and 221 (which also may be fastened to central plate 225) and may form two channels 240 and 241. In an embodiment, two channels 240 and 241 have recessed placeholders (not shown). In an embodiment illustrated in FIG. 1F, channels 240 and 241 may have three recessed placeholders. In an embodiment, a plate 225 may have holes or areas created as the recessed placeholder for embedded magnetic elements 250. In an embodiment, a bottom plate 230 may be solid and not have holes or areas bore into and the bottom of embedded magnetic elements 250 may rest on a top surface of the bottom plate 230. In an embodiment, embedded magnetic elements 250 of the connection node 215 may hold element link frames in place in the configurable table.

Figure 2A:
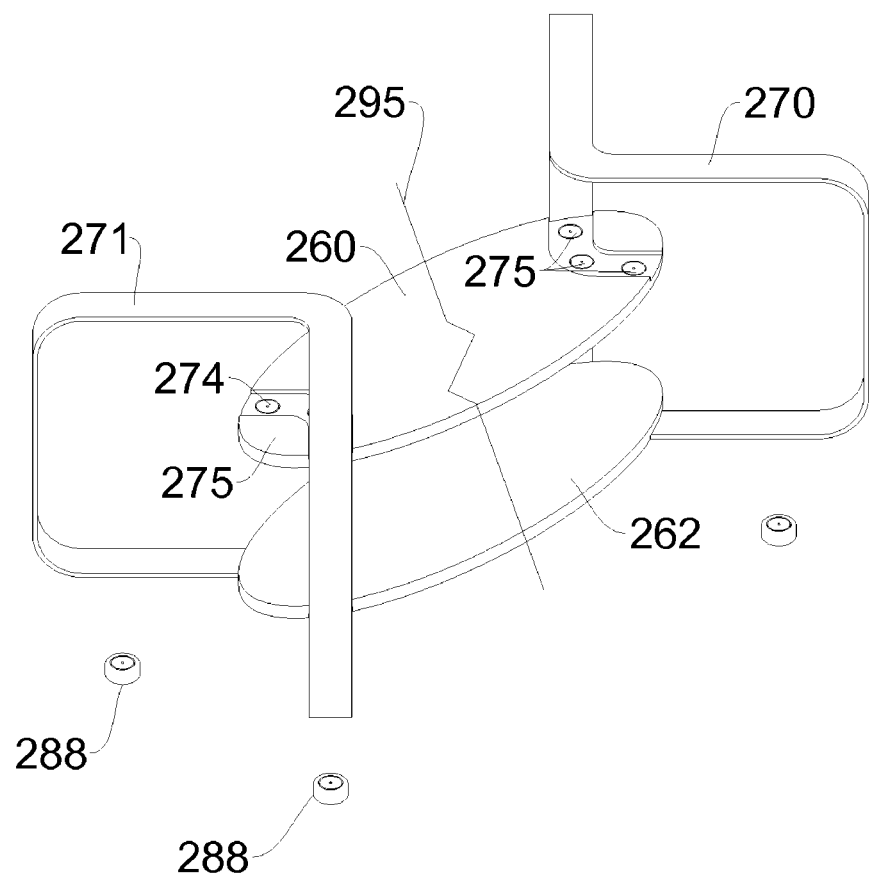
FIG. 2A illustrates an embodiment of a configurable table including an oval node connection.

FIG. 2A illustrates an embodiment of a configurable table including an oval node connection. Configurable table 255 may comprise element link frames 270 271 and connection nodes 260 and 262. In an embodiment, a connection node 260 may include channels 273 and 274 having three recessed placeholders (not shown) and three embedded magnetic elements 275. In an embodiment illustrated in FIG. 2A, a top surface of connection node 260 may include channels 273 and 274. Similarly, a connection node 262 may have two channels (not shown) having three recessed placeholders (not shown) and three embedded magnetic elements (not shown). In an embodiment, a bottom surface of connection node 262 may include more than one channels, e.g., two channels. In an example embodiment illustrated in FIG. 2A, two channels 273 274 may be at ends of the connection nodes 260 262 in order for configurable table 255 to have a longer length dimension. In an embodiment, a floor placeholder 288 may be magnetically coupled or connected to a bottom surface of horizontal sections of element link frames 270 271 to keep a configurable table 290 from sliding or moving on a surface on which it rests. In an embodiment, one or more magnetic elements 275 in channels 273 and 274 may magnetically couple bottom surfaces of horizontal sections of element link frames 270 and 271 to a connection node 260. In an embodiment illustrated in FIG. 2A, magnetic elements in channels of connection node 262 (which reside on a bottom surface of connection node 262) may magnetically couple top surfaces of horizontal sections of element link frames 270 and 271 to connection node 262.

Figure 2B:
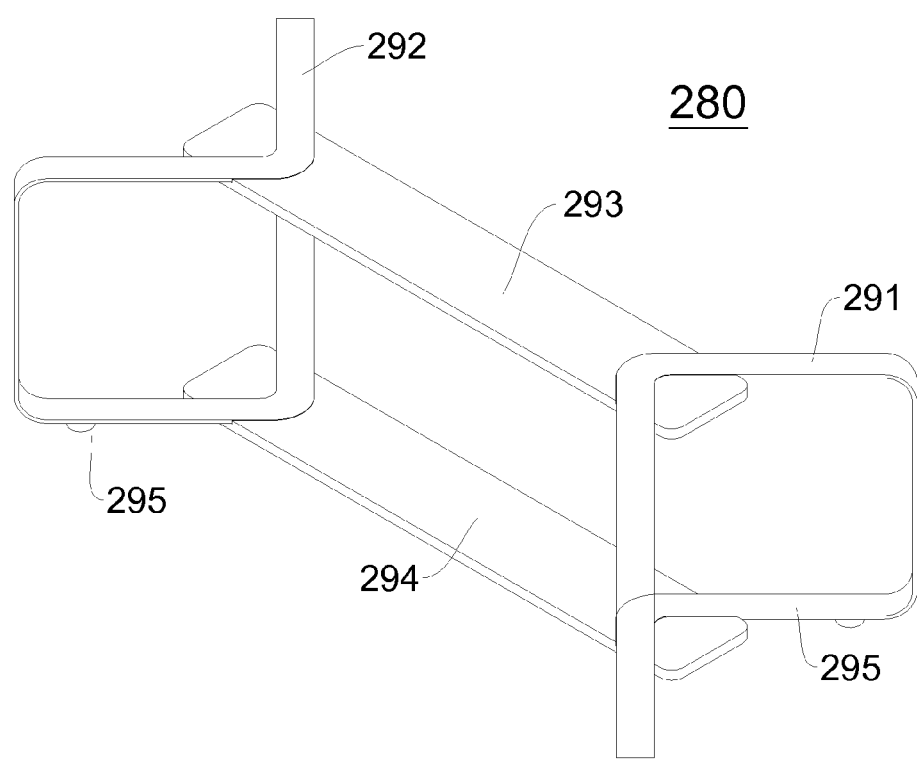
FIG. 2B illustrates an embodiment of a configurable table including a rectangular node connection.

FIG. 2B illustrates an embodiment of a configurable table including a rectangular node connection. Configurable table 280 may comprise element link frames 291 292 and connection nodes 293 294. In an embodiment, connection nodes 293 294 may each have two channels (not shown) having three recessed placeholders (not shown) and three embedded magnetic elements (not shown). In AN example embodiment illustrated in FIG. 2B, channels may be disposed at ends of the connection nodes 293 294 so that configurable table 280 may have a longer length dimension. In an embodiment, a floor placeholder 295 may be utilized on a bottom surface of the element link frames 291 292 to keep configurable table 280 from sliding or moving on a surface on which it rests. In an embodiment, for example, as illustrated in FIG. 2B, a bottom surface of top horizontal sections of the link element frames 291 292 may reside in the channels on a top surface of the top connection node 293. In an embodiment, a bottom surface of bottom horizontal sections of the link element frames 291 292 may reside in the channels on a top surface of the bottom connection node 294.

Figure 3A:
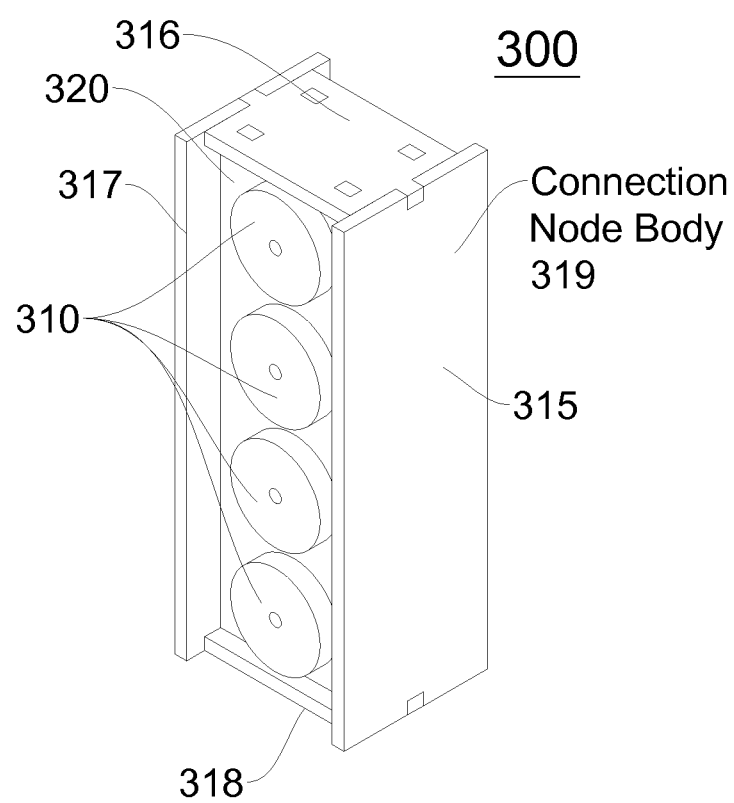
FIG. 3A illustrates a connection node frame according to an embodiment.

FIG. 3A illustrates a connection node frame according to an embodiment. In embodiments of the invention, connection node frame 300 may be utilized to connect link element frames. In an embodiment, connection node frame 300 may comprise a connection node body 319. In an embodiment, connection node body 319 may comprise two sides 315 and 317, a top section 316 and a bottom section 318. In an embodiment, connection node body 319 may also comprise a wall or vertical surface 320 disposed between top section 316, bottom section 318, and two sides 315 and 317. In an embodiment, portions of connection node body 319 may be comprised of a plastic, wood, metal or composite material. Connection node body 319 may comprise one or a plurality of magnetic elements 310. In an embodiment illustrated in FIG. 3A, four magnetic elements 310 may be located or resident in connection node body 319. In an embodiment, a plurality of magnetic elements 310 may be disposed vertically, in other words, in a column vertically. In an embodiment, a plurality of magnetic elements 310 may be connected to a connection node body via fasteners or by utilizing epoxy and/or another adhesive. In an embodiment, a plurality of magnetic elements 310 may be connected to wall or vertical surface 320 or disposed in a recessed placeholder in wall or vertical surface 320.

Figure 3B:
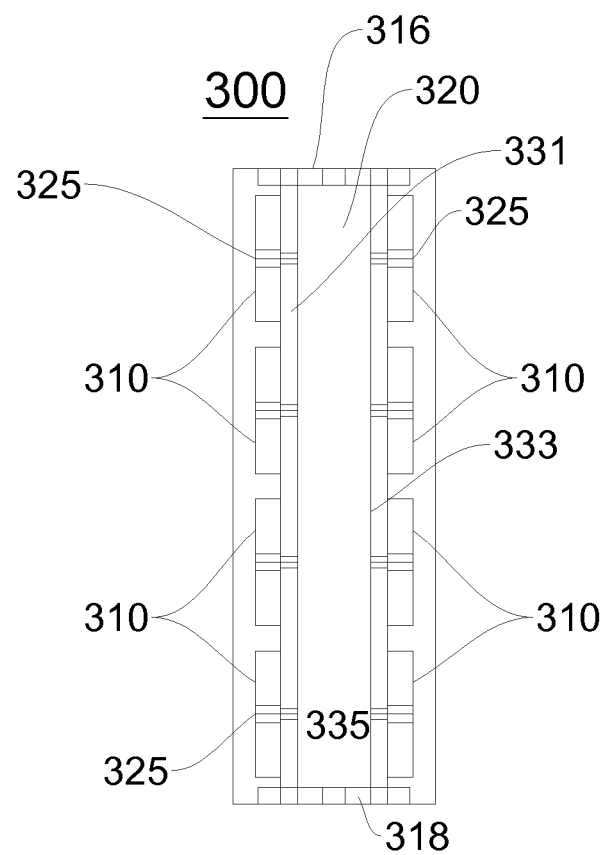
FIG. 3B illustrates a cross section of the connection node frame according to an embodiment.

FIG. 3B illustrates a cross section of connection node frame according to an embodiment. In FIG. 3B, connection node frame 300 may comprise a center plate or vertical wall 320. In an embodiment, center plate or vertical wall 320 may be comprised of a wood, plastic, metal or composite material. In an illustrated embodiment, one or more magnetic elements 310 may be connected to center plate or vertical wall 320 via connectors 325. In an embodiment, connector or fastener 325 may be a screw, a nut and bolt, or a magnetic material. In an embodiment, one or more magnetic elements 310 may be disposed vertically on center plate or wall 320. In an embodiment, one or more magnetic elements 310 may be disposed on both sides of center plate or vertical wall 320 and connection node frame 300 (which may be a front and a back of connection node frame 300). In an embodiment, center plate or vertical wall 320 may be comprised of one piece of material or may be comprised of a plurality of material sections. In an embodiment, for example, center plate or vertical wall 320 may be comprised of a first side 331, a second side 333, and a center section 335 to which first side 331 and second side 333 are connected. In this embodiment, first side 331 and second side 333 of center plate or vertical wall 320 may be connected or adhered to a top section 316 and/or a bottom section 318.

Figure 4A:
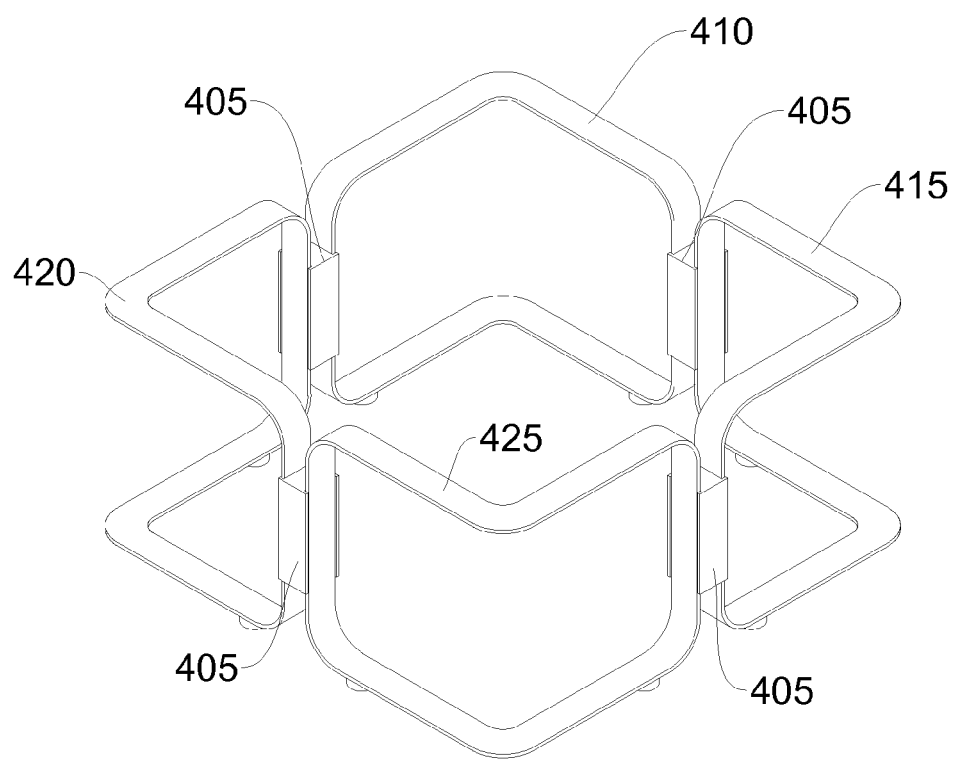
FIG. 4A illustrates a top perspective view of configurable table including connection node frames according to an embodiment.

FIG. 4A illustrates a top perspective view of configurable table including connection node frames according to an embodiment. In an embodiment, a configurable table 400 may comprise a plurality of element link frames 410 415 420 and 425. A configurable table 400 may comprise a plurality of connection node frames 405. In an embodiment, connection node frames may be disposed vertically, as is illustrated in FIG. 4A. In an embodiment, connection node frames 405 may be disposed horizontally. In an embodiment, connection node frames 405 may be disposed on vertical sections of element link frames 410 415 420 and 425. In an embodiment, connection node frames 405 may magnetically couple or connect adjoining element link frames. For example, as illustrated in FIG. 4A, connection node frame 405 magnetically couples element link frame 425 and element link frame 420. In an embodiment, magnetic elements on each side of connection node frame 405 couple to a vertical leg or section of an element link frame. For example, as illustrated in FIG. 4A, at least one magnetic elements on sides of connection node frame 405 magnetically couple to vertical legs of the element link frames 410 415 420 and 425.

Figure 4B:
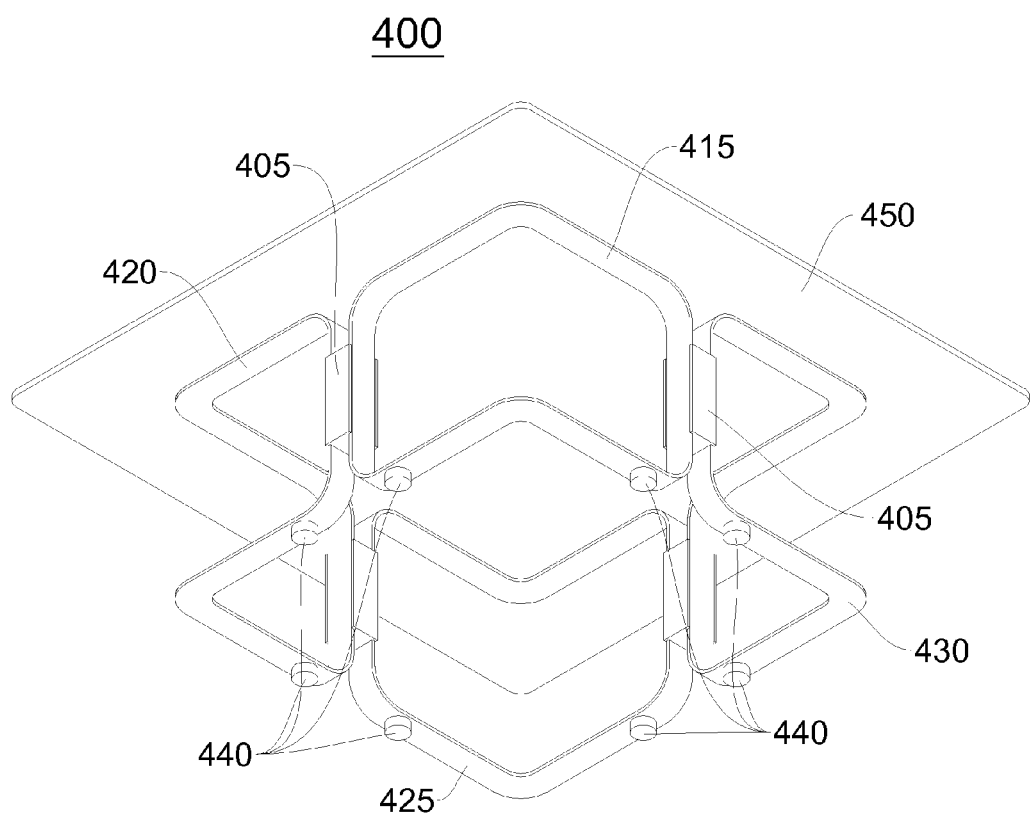
FIG. 4B illustrates a bottom perspective view of configurable table including connection node frames according to an embodiment.

FIG. 4B illustrates a bottom perspective view of configurable table including connection node frames according to an embodiment. In an embodiment, configurable table 400 may comprise a table top 450, a plurality of element link frames 430 415 420 and 425, a plurality of connection node frames 405, and a plurality of floor place holders 440. In an embodiment, plurality of floor place holders 440 may be placed on a bottom side of a horizontal element of the element link frames 415 420 425 and 430. In an embodiment illustrated in FIG. 4B, element line frame comprise two floor place holders 440 placed on bottom surfaces of different horizontal elements of the four element link frames 415 420 425 and 430. In an embodiment, different horizontal elements may refer to link elements that may be perpendicular with respect to one another. In an embodiment, four element link frames 415 420 425 and 430 may be connected by four connection node frames 405. In an embodiment, four connection frames 405 may be magnetically coupled on vertical elements or sections of element link frames 415 420 425 and 430.

Figure 5A:
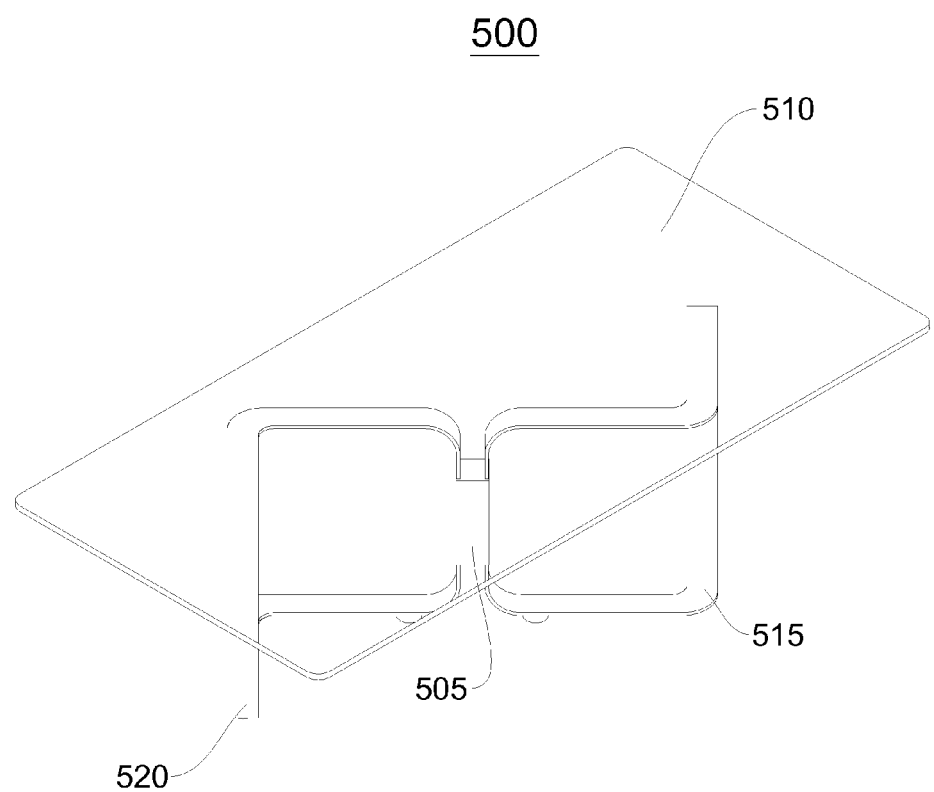
FIG. 5A illustrates a top perspective view of a configurable table according to an embodiment.
Figure 5B:
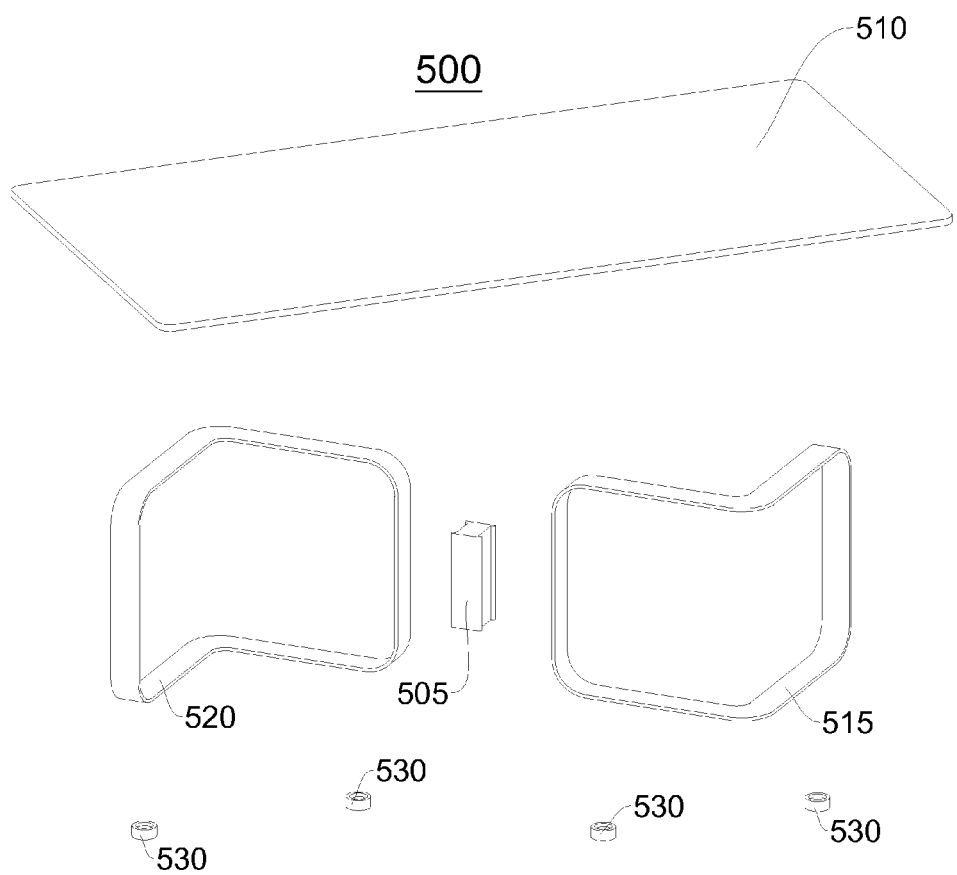
FIG. 5B illustrates an exploded view of the configurable table of FIG. 5A.

FIG. 5A illustrates a top perspective view of a configurable table according to an embodiment. In an embodiment, a configurable table 500 may comprise a top surface 510, a plurality of element link frames 515 and 520 and a connection node frame 505. In an embodiment, a plurality of element link frames 510 and 520 may be placed in a manner so that element link frames 515 and 520 are mirror images of each other, and/or symmetrical with respect to another link frame (e.g., element link frame 515 may be symmetrical with respect to element link frame 520). In an embodiment, magnetic elements in connection node frame 505 may magnetically couple vertical sections of element link frames 510 520 to a connection node frame 505. FIG. 5B illustrates an exploded view of the configurable table of FIG. 5A. In an embodiment, a plurality of floor placeholders 530 may be fastened, coupled or connected to a bottom surface of horizontal elements of the element link frames 515 and 520. In an embodiment, two placeholders 530 may be included with each element link frame 515 or 520.

Figure 6A:
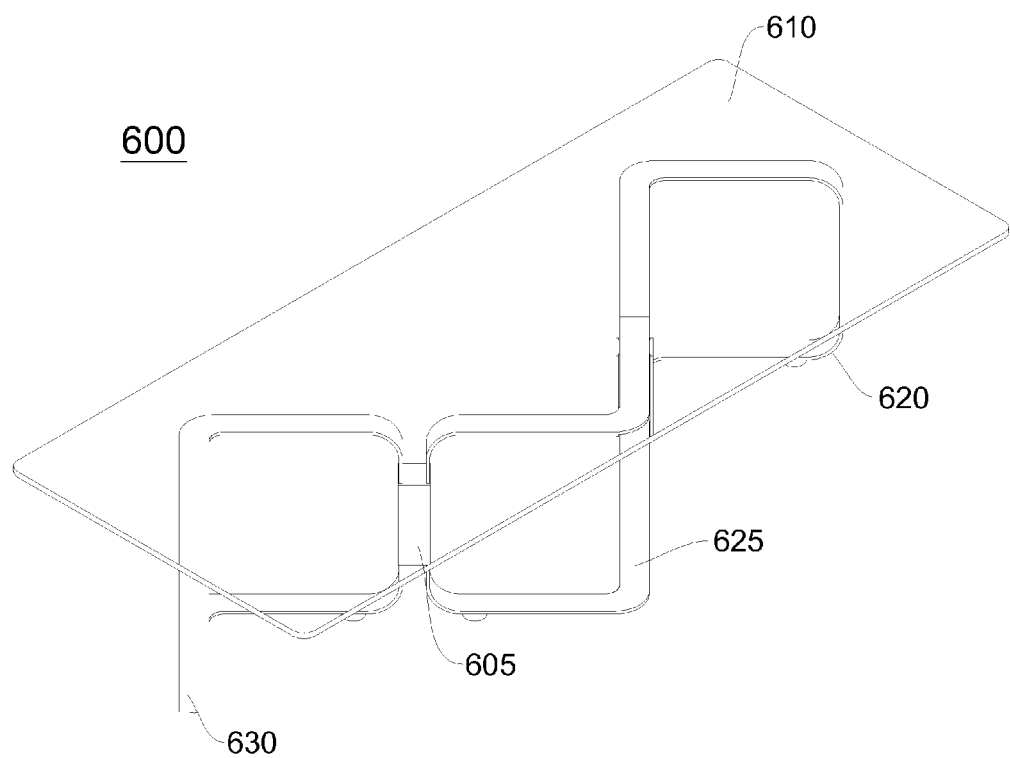
FIG. 6A illustrates a top perspective view of a configurable table with a top according to an embodiment.
Figure 6B:
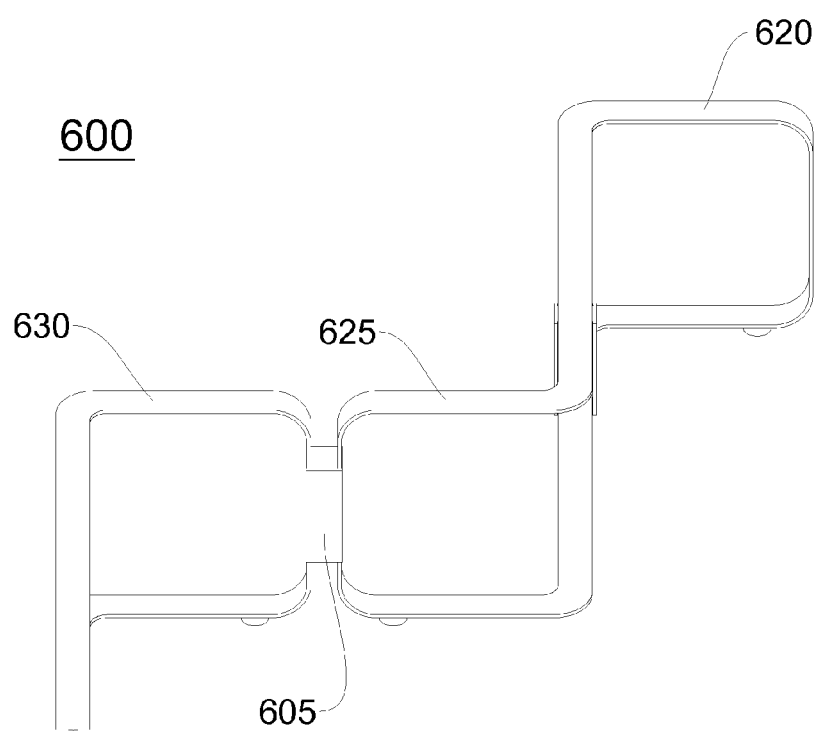
FIG. 6B illustrates a top perspective view of a configurable table according to an embodiment.
Figure 6C:
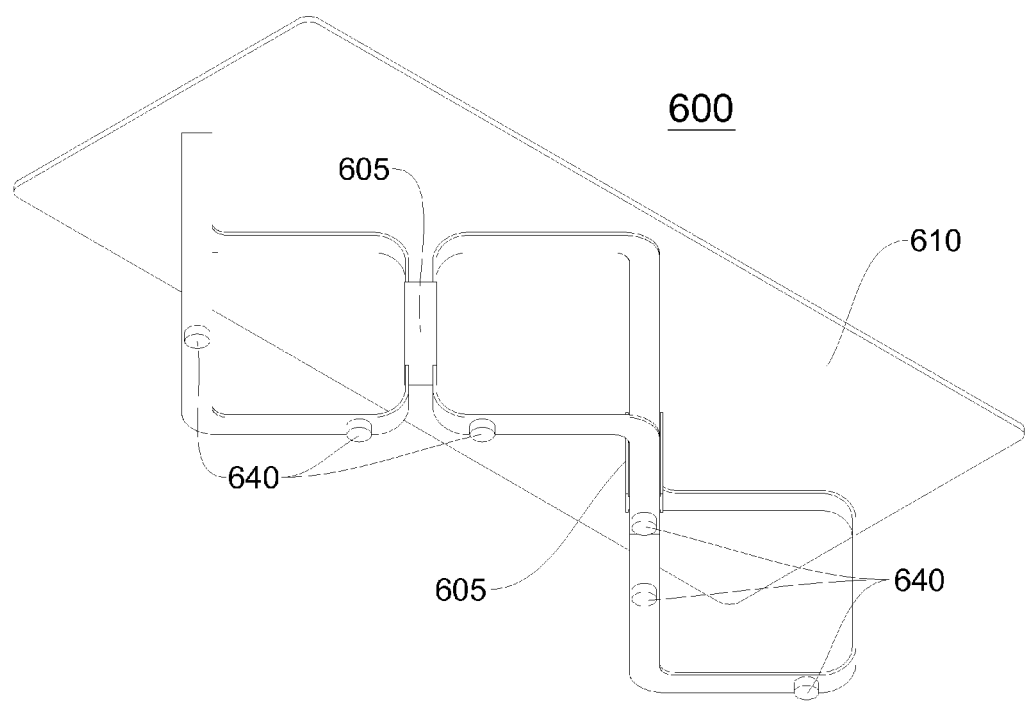
FIG. 6C illustrates a bottom perspective view of a configurable table with a top according to an embodiment.

FIG. 6A illustrates a top perspective view of a configurable table with a top according to an embodiment. FIG. 6B illustrates a top perspective view of a configurable table without a table top according to an embodiment. In an embodiment, configurable table 600 may comprise a top surface or a table top 610, a plurality of element link frames 620 625 and 630, and a plurality of connection node frames 605. In an embodiment illustrated in FIG. 6B, configurable table 600 may three element link frames 620 625 and 630 and two connection node frames 605. In an embodiment, connection node frames 605 may connect vertical elements or sections of, for example, adjoining element link frames 625 and 630. In an embodiment, another connection node frame (not shown) may connect vertical elements or sections of adjoining element link frames 620 and 625. FIG. 6C illustrates a bottom perspective view of a configurable table with a top according to an embodiment. The configurable table 600 may comprise a top surface or table top 610, a plurality of element link frames 620 625 and 630, a plurality of connection node frames 605, and a plurality of floor place holders 640. In an embodiment, an element link frame (e.g., 620 or 625 (e.g., see FIG. 6B)) may include two or more floor placeholders 640. In an embodiment, horizontal sections of element link frames 620 625 and 630 may include floor placeholders. In illustrative embodiment of FIG. 6C, configurable table 600 may include six floor placeholders 640 for the three element link frames 620 625 and 630 (e.g. two floor placeholders may be coupled to an element link frame). In an embodiment, placeholders 640 may be connected, fastened, and/or adhered to a bottom surface of the element link frames 620 625 and 630.

Figure 7A:
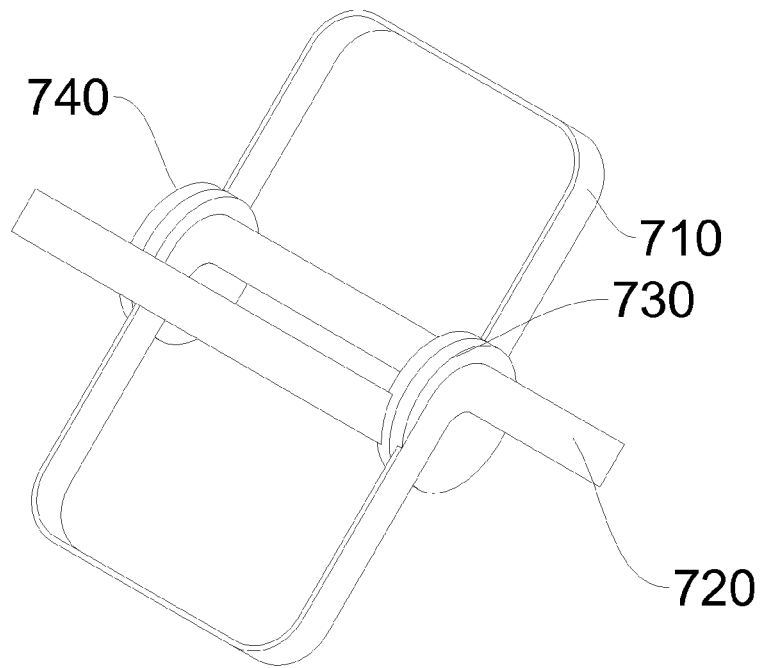
FIG. 7A illustrates a configurable table base according to an embodiment.

FIG. 7A illustrates a configurable table base according to an embodiment. In an embodiment, a configurable table 700 may comprise a plurality of link element frames 710 and 720 and a plurality of connection nodes 730 and 740. In an illustrated embodiment of FIG. 7A, one leg of the link element frame 720 may be connected or coupled to a channel (not shown) of connection node 730. Channel of connection node 730 may include magnetic elements in recessed placeholders. Illustratively, in an embodiment, a channel may be present or disposed on an outside surface of connection node 730. In an illustrated embodiment, for example such as FIG. 7A, another leg of the link element frame 720 may be connected or coupled to a channel comprising magnetic elements of a connection node 740. Illustratively, a channel may be on an inside surface of a connection node 740. Thus, in an embodiment, a section of element link frame 720 may be connected, fastened, press-fit, or adhered to an outside surface of one connection node 730 and another section of element link frame 720 may be connected, fastened, press-fit, or adhered to an inside surface of another connection node 740. Similarly, in an embodiment, a leg of link element frame 710 may be connected to an inside surface of connection node 730 utilizing a channel comprising magnetic elements. In an embodiment, a leg or section of link element frame 710 may be connected, coupled, fastened, press-fit, or adhered to an outside surface of connection node 740 and another leg or section of link element frame 710 may be connected, coupled, fastened, press-fit, or adhered to an inside surface of another connection node 730. In an embodiment, a channel may be on an outside surface of connection node 740.

Figure 7B:
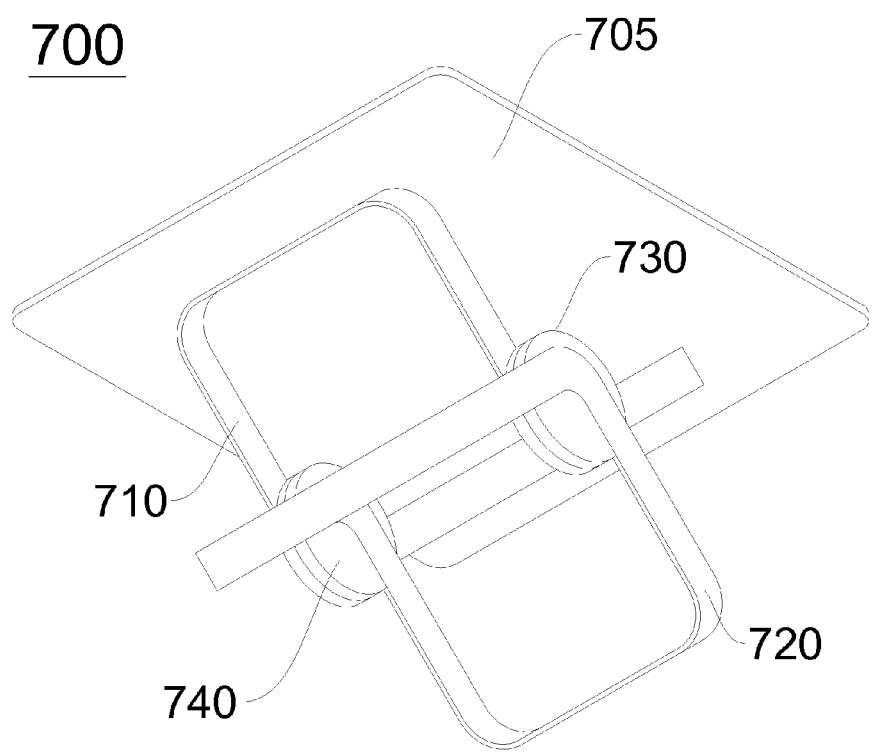
FIG. 7B illustrates a bottom perspective view of a configurable table according to an embodiment.

FIG. 7B illustrates a bottom perspective view of a configurable table according to an embodiment. In an embodiment, configurable table 700 may comprise a plurality of link element frames 710 and 720, a plurality of connection nodes 730 and 740, and a table top 705. The table top 705 may be comprised of a glass, a cloth, a metal, a wood material, a composite material, or any combination thereof. In an embodiment, as is illustrated in FIG. 7B, a table top 705 may rest on ends of an element link frame 710. In an embodiment, as is illustrated in FIG. 7B, another element link frame may rest on a ground (or a surface) and may be connected to element link frame 720 by connection nodes 730 and 740 This is different than other embodiments of a configurable table where the table top 705 may be magnetically coupled or connected to a plurality of element link frames and not only one element frame. In an embodiment, connection nodes 730 and 740 may be disposed vertically with respect to a resting surface.

Figure 8A:
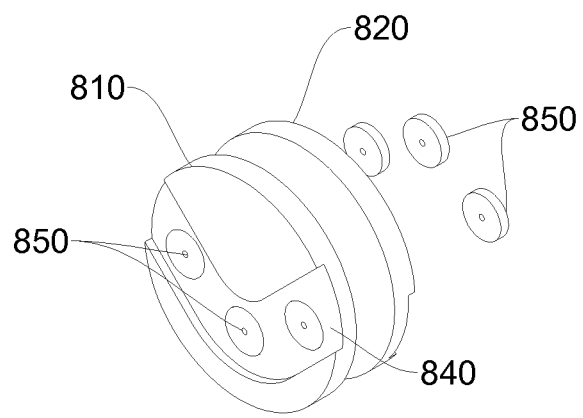
FIG. 8A illustrates a connection node for a configurable table according to an embodiment.

FIG. 8A illustrates a vertically disposed connection node according to an embodiment of the invention. In an embodiment, a vertically disposed connection node 800 may comprise a first plate 810 and a second plate 820. In an embodiment, a first plate 810 and a second plate 820 may be connected via a fastener. In an embodiment, a first plate 810 and a second plate 820 may be adhered together via an adhesive, for example, an epoxy. In an embodiment, a first plate 810 and a second plate 820 may be comprised of a wood, plastic, metal or composite material, or any combination thereof. In an embodiment, a first plate 810 and/or a second plate 820 may comprise a channel 840 or a plurality of channels (not shown). In an embodiment, a first plate 810 and/or a second plate may comprise channels on one side and not on the other side. In an embodiment, a channel 840 may be disposed or present on an outer surface of first plate 810 or a second plate 820. In an embodiment, a channel 840 or a plurality of channels may include recessed placeholders into which one or more magnetic elements 850 may be placed or disposed. In an embodiment, one or more magnetic elements 850 may be pressed into a recessed placeholder during manufacturing (by a press). In an embodiment, one or more magnetic elements 850 may be glued or adhered to a surface in a recessed placeholder by glue and/or an epoxy.

Figure 9:
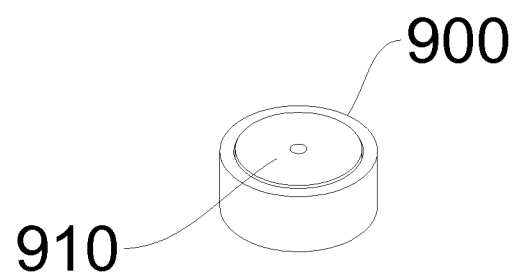
FIG. 9 illustrates a floor placeholder for a configurable table according to an embodiment.

FIG. 9 illustrates a floor placeholder according to an embodiment. In an embodiment, floor placeholder 900 may include a container 905 and an embedded magnetic element 910. In an embodiment, container 905 may include an edge and/or lip and a hollowed out center section into which embedded magnetic element 910 may be placed or may reside. In an embodiment, an embedded magnetic element 910 may be made of iron or another magnetic metal. In an embodiment, container 905 may be comprised of a plastic, rubber, wood, or composite non-conductive material, or any combination thereof. In an embodiment, floor placeholder 900 may have a circular, rectangular, square or other shape. In an embodiment, shape may depend on a construction and shape of the element link frame. In an embodiment, embedded magnetic element 910 may be pressed into container 905 during manufacture or alternatively, may be glued or epoxied into container 905.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A configurable table, comprising:
   a first element link frame;
   a second element link frame;
   a first connection node, the connection node comprising a channel, the channel having a plurality of holders;
   a plurality of magnetic elements, the plurality of magnetic elements being disposed in the plurality of holders, and connecting to the first element link frame and the second element link frame; and
   a second connection node, the second connection node comprising a channel, the channel having a plurality of holders, and the plurality of magnetic elements being disposed in the plurality of holders in the second connection node.

2. The configurable table of claim 1, wherein the channels of the first connection node are present on a top surface of the first connection node and the channels of the second connection node are present on a bottom surface of the second connection node.

3. The configurable table of claim 2, further comprising a table top.

4. The configurable table of claim 1, wherein the first connection node is in a parallel plane with regard to the second connection node.

5. The configurable table of claim 1, further including a plurality of floor placeholders.

6. The configurable table of claim 5, the plurality of placeholders including a magnetic element and a container.

7. The configurable table of claim 1, wherein the first element link frame comprises two horizontal sections connected to two vertical sections.

8. The configurable table of claim 7, wherein the two horizontal sections comprise two pieces connected at a right angle.

9. A configurable table, comprising:
   a first element link frame;
   a second element link frame;
   a first connection node comprising two channels;
   a second connection node comprising two channels; and
   a plurality of magnetic elements, the plurality of magnetic elements disposed in the two channels of the first connection node and the two channels of the second connection node, and the plurality of magnetic elements connecting the first connection node to the first element link frame and the second element link frame and connecting the second connection node to the first element link frame and the second element link frame.

10. The configurable table of claim 9, further comprising a plurality of floor placeholders disposed on a bottom surface of the first element link frame.

11. The configurable table of claim 9, further comprising a table top.

12. A configurable table, comprising:
   a first element link frame;
   a second element link frame;
   a first circular connection node comprising two channels;
   a second circular connection node comprising two channels; and
   a plurality of magnetic elements disposed in the two channels of the first and second circular connection node and connecting the first element link frame to the second element link frame.

13. The configurable table of claim 12, an inside surface of the first element link frame connected to a channel on an outside surface of the first circular connection node and an outside surface of the first element link frame connected to a channel on an inside surface of the first circular connection node.

14. The configurable table of claim 12, an inside surface of the second element link frame connected to a channel on an outside surface of the second circular connection node and an outside surface of the second element link frame connected to a channel on an inside surface of the second circular connection node.

15. The configurable table of claim 12, wherein the first element link frame rests on a surface and the second element link frame does not rest on the surface.

16. The configurable table of claim 12, the first circular connection node comprises a first circular half with one of the two channels fastened to a second circular half with a second of the two channels.

* * * * *